United States Patent
Hamburger et al.

(10) Patent No.: US 7,504,606 B2
(45) Date of Patent: Mar. 17, 2009

(54) APPARATUS AND METHOD FOR SEPARATING FLUID FLOWS IN A HEATING DEVICE

(75) Inventors: Andreas Hamburger, Germersheim (DE); Christian Dörrie, Germersheim (DE)

(73) Assignees: Eichenauer Heizelemente GmbH & Co. KG, Kandel (DE); Beru AG, Ludwigsburg (DE)

( * ) Notice: Subject to any disclaimer, the term of this patent is extended or adjusted under 35 U.S.C. 154(b) by 174 days.

(21) Appl. No.: 11/119,935

(22) Filed: May 3, 2005

(65) Prior Publication Data

US 2005/0242082 A1    Nov. 3, 2005

(30) Foreign Application Priority Data

May 3, 2004    (DE)    ................... 20 2004 007 039 U

(51) Int. Cl.
*H05B 3/16* (2006.01)
*H01C 1/02* (2006.01)

(52) U.S. Cl. ...................................... 219/543; 338/226

(58) Field of Classification Search ................. 219/543, 219/542, 200, 202, 538, 540; 338/226, 307; 204/660, 564, 672, 673, 674
See application file for complete search history.

(56) References Cited

U.S. PATENT DOCUMENTS

| | | | |
|---|---|---|---|
| 3,879,599 A * | 4/1975 | Kodaira | ....................... 219/388 |
| 4,469,582 A * | 9/1984 | Sublette et al. | ............. 204/666 |
| 4,576,798 A * | 3/1986 | Hall et al. | .................... 422/105 |
| 5,057,672 A | 10/1991 | Bohlender et al. | |
| 5,775,407 A | 7/1998 | Jnoue | |
| 6,472,645 B1 | 10/2002 | Bohlender | |
| 6,717,115 B1 * | 4/2004 | Pfahnl et al. | ............. 219/444.1 |
| 6,972,077 B2 * | 12/2005 | Tipton et al. | ................. 204/269 |
| 7,138,206 B2 * | 11/2006 | Yoshida et al. | .............. 429/129 |
| 2005/0040045 A1 * | 2/2005 | Nilsen et al. | ................. 204/672 |

FOREIGN PATENT DOCUMENTS

| | | |
|---|---|---|
| DE | 82 36 581.4 U1 | 6/1983 |
| DE | 198 23 061 A1 | 11/1997 |
| DE | 197 55 698 A1 | 6/1999 |
| DE | 102 50 287 C1 | 11/2003 |
| EP | 0 768 197 A2 | 4/1997 |
| EP | 1 507 126 A2 | 2/2005 |

* cited by examiner

*Primary Examiner*—Daniel L. Robinson
(74) *Attorney, Agent, or Firm*—Antonelli, Terry, Stout & Kraus, LLP.

(57) ABSTRACT

An apparatus for separating fluid flows in a heating device, particularly for heating the interior of a motor vehicle is proposed, the heating device having at least one heater equipped with a plurality of lamellar heat emission or delivery elements. In order to ensure an easy, inexpensive separation of several fluid flows and in particular also downstream of the heater equipped with the lamellar heat emission elements, according to the invention a substantially plate-shaped separator is provided having an opening with a contour adapted for the pushing of the separator onto the heater equipped with the lamellar heat emission elements. The invention also relates to a method for separating several fluid flows in a heating device of the aforementioned type.

15 Claims, 4 Drawing Sheets

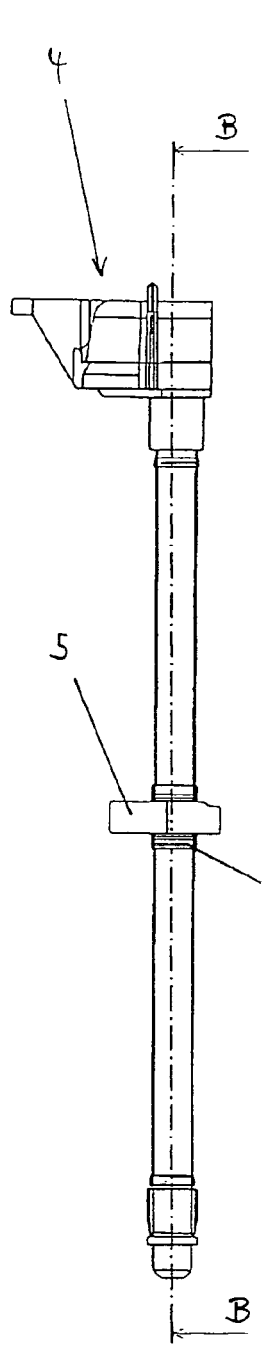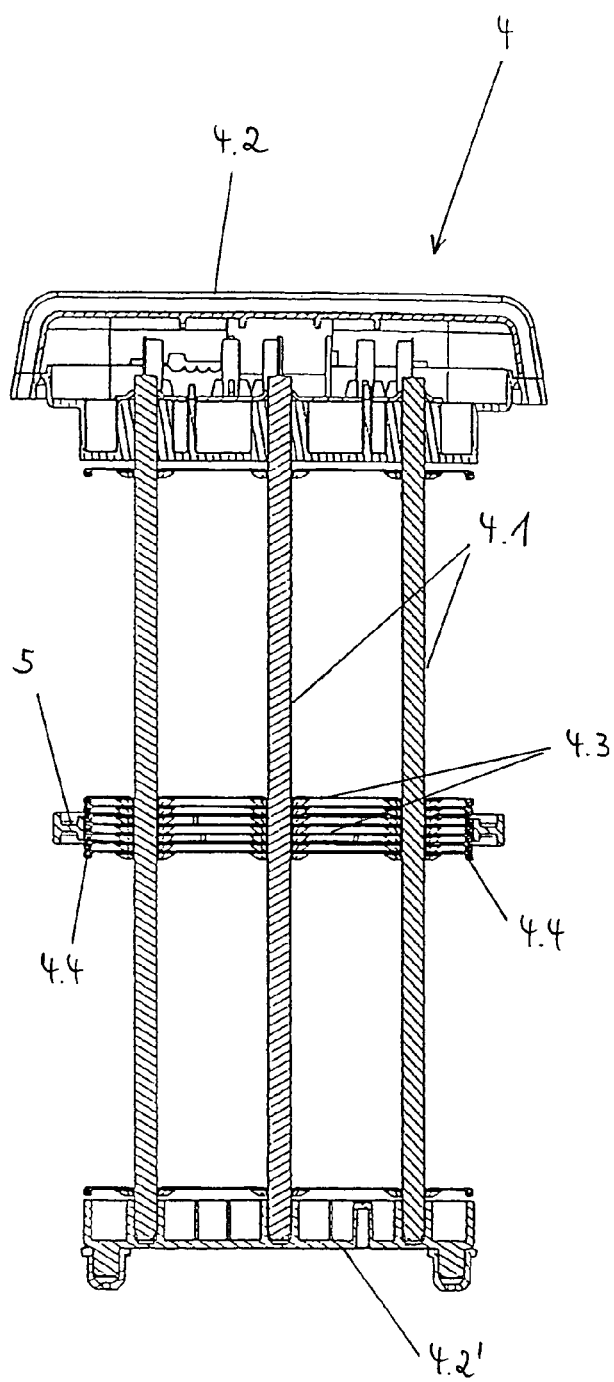
Fig. 2a  Fig. 2b

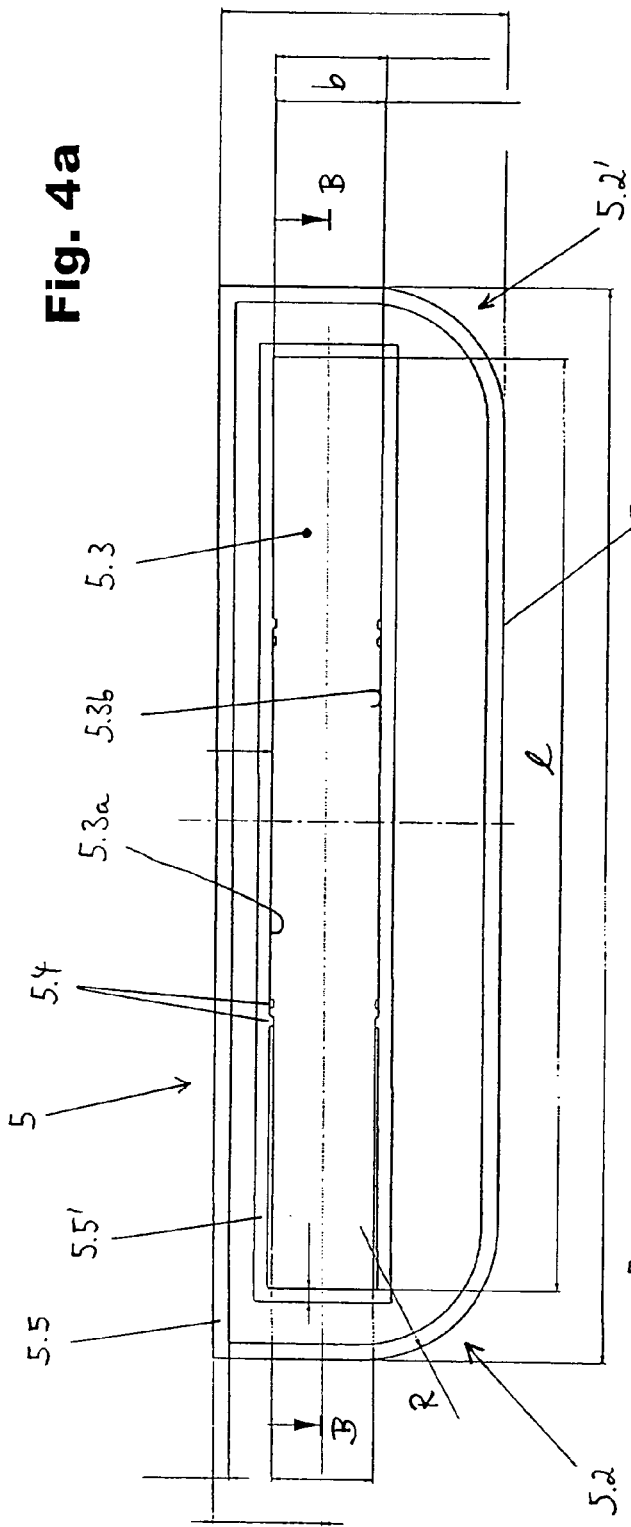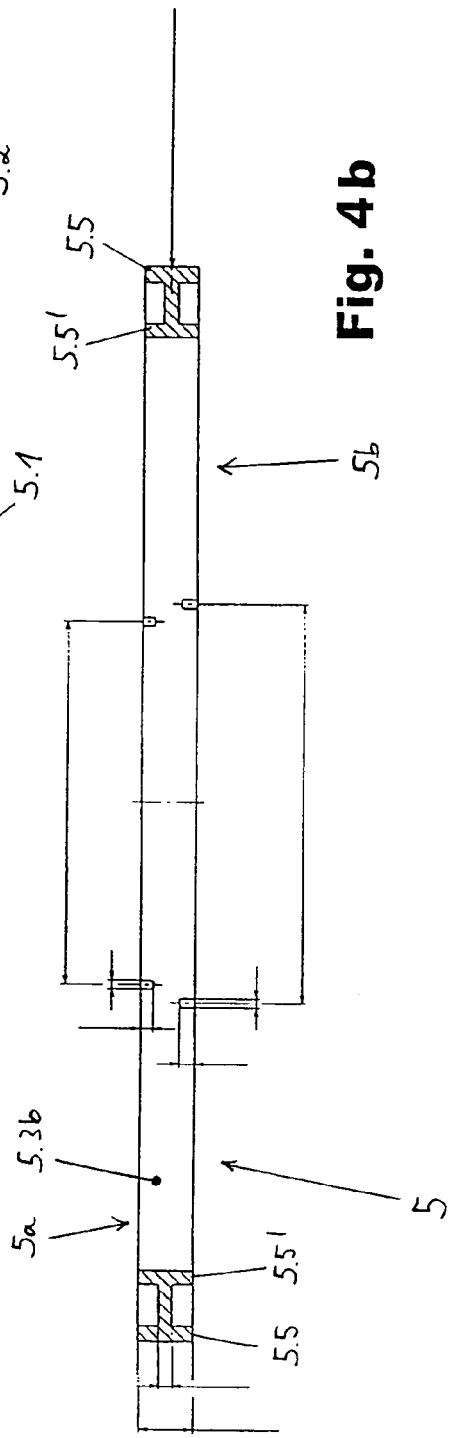

APPARATUS AND METHOD FOR SEPARATING FLUID FLOWS IN A HEATING DEVICE

FIELD OF THE INVENTION

The invention relates to an apparatus for separating fluid flows in a heating device, particularly for heating the interior of a motor vehicle, where the heating device has at least one heater equipped with a plurality of lamellar heat emission elements.

BACKGROUND OF THE INVENTION

In the motor vehicle industry there is an increasing need for heating concepts in which, based on a separate air guidance (circulating or fresh air), it is possible to implement separate heating zones within the interior of a motor vehicle (e.g. on the driver and front seat passenger side).

Nowadays such heating devices regularly have additional electrical heaters, preferably using PTC heating resistors, which are located together with a conventional heat source in an airflow to the passenger interior of the motor vehicle. Said additional heaters generally have an arrangement of parallel, lamellar heat emission elements, which are e.g. located in clamping manner on one or more tubes, particularly profile tubes, e.g. heated by means of PTC elements and which are in good heat conducting connection with the PTC heating resistors and the airflow through the heating device flows round the same in order to transfer heat to them (EP 1 507 126 A2). It is also standard practice to use substantially sinusoidal, lamellar heat emission elements, which are so positioned on tubular or frame elements e.g. also heated by PTC elements that a good heat conducting connection is ensured and the heat is delivered from the heat emission elements to an airflow to be heated and which flows around the same (EP 1 061 776 A1, U.S. Pat. No. 5,057,672 A).

In order to bring about separate heating zones in the passenger interior of the motor vehicle the air guidance through the heating device can take place from the front and is subdivided by corresponding partitions into several fluid flows.

The problem of the invention is to provide an inexpensive and easily fittable apparatus for use in the above-described heating devices making it possible to bring about or maintain a separation of the fluid flows, more particularly downstream of a lamellar additional heater.

SUMMARY OF THE INVENTION

According to the invention this problem is solved by an apparatus for separating fluid flows in a heating device, particularly for heating the interior of a motor vehicle, the heating device having at least one heater equipped with a plurality of lamellar heat emission or delivery elements and with a substantially plate-shaped separator, which has an opening with a contour adapted for pushing the separator onto the heaters equipped with the lamellar heat emission elements.

Thus, the invention permits a simple, inexpensive, separate fluid guidance in the case of a heater equipped with a plurality of lamellar heat emission elements, e.g. for the circulating and fresh air and/or for the driver and front seat passenger in a motor vehicle, two separate fluid flows being formed upstream and downstream of the heater. It is pointed out at this point that the term "lamellar heat emission elements" refers both to those elements which are positioned in substantially parallel rows on one or more tubes of the heater and are held there e.g. in force fit manner, such as is e.g. known from the aforementioned EP 1 507 126 A2, and those elements which have a substantially sinusoidal design in the manner of corrugated iron with a finite width and which are also in heat conducting connection with tube or frame elements, such as are e.g. known from the also aforementioned EP 1 061 776 A1 and U.S. Pat. No. 5,057,672 A.

Preferably, as a result of the flow geometry through the heating device, a plate plane of the separator in the pushed on state is positioned substantially perpendicular to the extension direction of the heater or the tube or tubes. In the case of a plurality of parallel, lamellar heat emission elements of the heater, e.g. having a substantially platelet-like design, preferably a plate plane of the separator in the pushed on state is consequently substantially parallel to a longitudinal edge of the heat emission elements, whereas in the case of substantially sinusoidal, lamellar heat emission elements a plate plane of the separator is preferably perpendicular to the plane of the sinusoidal path of the heat emission element, i.e. in the direction of its width between sinusoidal, wavy edges.

In order to permit an easy pushing on of the separator onto the heater, according to a further development of the inventive apparatus, the opening substantially has dimensions corresponding to the length and width of the heat emission elements.

It can be particularly advantageous if the opening engages in substantially gas-tight manner by its entire circumference on the outer contour of the heat emission elements, so that there is no need for additional seals between the heater or its lamellar heat emission elements and the separator. However, obviously, as a function of the intended use, a seal, such as e.g. a ring seal can be provided, which seals the separator against the lamellar heat emission elements of the heater, at least over part of the circumference of its opening.

As the heat emission elements of the heater can be subject to significant heating as a result of the heating power thereof, the separator is preferably made from a heat-resistant material, which can be a plastics material. According to a highly preferred development of the inventive apparatus, the material of the separator can have a yielding flexibility, in order to be able to reversibly widen the opening for the pushing onto the heater equipped with the lamellar heat emission elements, so that the separator is subsequently held in force fitting manner on the heat emission elements of the heater.

In order to further improve the retaining characteristics of the separator on the heater, according to a preferred development, at least in the vicinity of its opening, the separator has an adequate thickness for it to be in contact with at least two, particularly with at least three adjacent, lamellar heat emission elements or with at least two, particularly three adjacent bend-backs of at least one substantially sinusoidal, lamellar heat emission element, so that there are numerous contact points with the lamellar heat emission elements.

Additionally an apparatus according to the invention can have projections on the inner wall of the separator defining the opening and which can be engaged in the gap between at least two adjacent, substantially parallel, lamellar heat emission elements or in the gap between at least two adjacent bend-backs of at least one substantially sinusoidal, lamellar heat emission element. Thus, as a result of a hooking or locking of the projections between the heat emission element or elements, there is a completely satisfactory fixing of the separator, particularly so as to prevent any displacement thereof in the axial direction of a heater tube on the heater equipped with the lamellar heat emission elements. If the apparatus consequently has a plurality of substantially parallel, lamellar heat emission elements, the apparatus according to the invention preferably has projections on at least one inner wall of the separator defining the opening and extending parallel to the longitudinal edges of the heat emission elements and constructed for holding the separator in a direction perpendicular to the orientation of the lamellar heat emission elements by in each case engaging in a gap between said elements. According to the invention the projections consequently hook in between the individual heat emission elements, so that the separator in its original, unwidened state can no longer readily shift.

For bringing about an optimum separating action, according to the invention the separator is preferably located downstream of a further heating unit of the heating device, such as a heat exchanger linked with the cooling water circuit of a motor vehicle.

In order to permit a simple, hydraulically favourable installation of the separator, according to a further variant of the inventive apparatus, an outer contour of the separator is constructed in accordance with a receptacle in a holding part for said separator and optionally the further heating unit. According to a highly preferred development of the inventive apparatus, an outer contour of the separator is constructed in substantially rectangular manner with two rounded angles defining a longitudinal side of the contour rectangle. For stability reasons the separator can also have a circumferential, double H-shaped cross-sectional profile, whose parallel sides form the outer contour or the opening-defining inner walls of the separator.

For solving the problem of the invention, the latter also relates to a method for the separation of fluid flows in a heating device with at least one heater equipped with a plurality of lamellar heat emission or delivery elements, particularly for heating the interior of a motor vehicle, in which a substantially plate-shaped separator with a preferably substantially central opening is pushed onto the heater equipped with the lamellar heat emission elements.

According to a preferred embodiment of the method the separator is pushed onto the heater equipped with the lamellar heat emission elements in such a way that in the pushed on state it is positioned substantially perpendicular to the extension direction of the heater or at least a (profile) tube thereof and/or, if there are several substantially parallel heat emission elements, a plate plane thereof extends substantially parallel to the longitudinal edges of the heat emission elements.

For pushing onto the heater equipped with the lamellar heat emission elements, the separator is preferably reversibly deformed, particularly by widening the opening.

To ensure a completely satisfactory seating of the separator on the heater, it is also possible for the projections on an inner wall of the separator defining the opening to engage in the gap between at least two and preferably at least three adjacent, substantially parallel, lamellar heat emission elements or in the gap between at least two and preferably at least three adjacent bend-backs of at least one substantially sinusoidal, lamellar heat emission element, so that the separator is locked between several heat emission elements and/or between the bend-backs of one or more substantially sinusoidal heat emission elements.

BRIEF DESCRIPTION OF THE DRAWINGS

Further advantages and characteristics of the invention can be gathered from the following description of an embodiment relative to the attached drawings, wherein show:

FIG. 2a An additional electric heater with a plurality of lamellar heat emission elements of the heating device according to FIG. 1 with a pushed on separator in side view.

FIG. 2b A section along line B-B in FIG. 2a.

FIG. 4a A plan view of the separator.

FIG. 4b A section along line B-B in FIG. 4a.

DETAILED DESCRIPTION OF THE DRAWINGS

Figure 1:
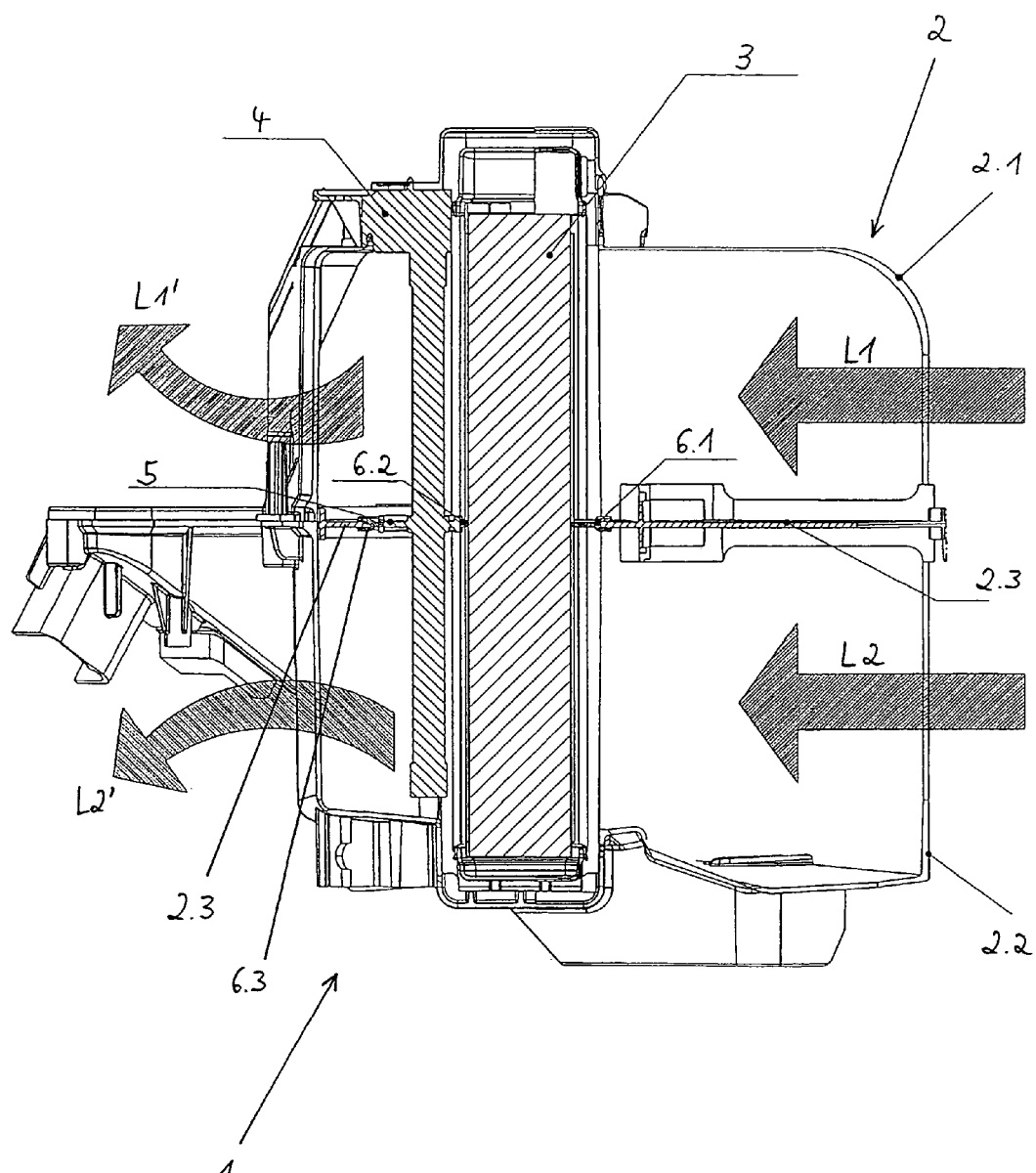
FIG. 1 A longitudinal section through a heating device for heating the interior of a motor vehicle with separate airflows.

FIG. 1 shows in longitudinal section a heating device 1 for heating the interior of a motor vehicle. According to the embodiment shown, the heating device 1 has a casing 2 with an upper part 2.1 and a lower part 2.2, which also has a partition wall 2.3 for separate air guidance (arrows L1, L2).

For heating the airflows L1, L2 a heat exchanger 3 is provided and is connected to the cooling water circuit of the motor vehicle in question. Downstream of the heat exchanger 3 is provided an additional electric heater 4 in the form of a PTC heater onto which are clamped in the form of a parallel row a plurality of lamellar heat emission or delivery elements to be described in greater detail hereinafter relative to FIGS. 2a, b.

According to the invention, onto the additional heater 4 equipped with the heat emission elements, as shown in FIG. 1, is engaged a separator 5. Downstream of the heater 3, the separator 5 serves to maintain the separate air guidance L1', L2', e.g. for the separator, independent heating of a driver and front seat passenger area of the vehicle. For this purpose, in the contact areas between the partition wall 2.3 and heat exchanger 3, the separator 5 and the heat exchanger 3 and the separator 5 and partition wall 2.3 suitable seals 6.1, 6.2, 6.3 are provided.

FIGS. 2a, b show in detail the additional heater 4 of FIG. 1. FIG. 2a shows in side view the additional heater 4 with the pushed on separator 5. As can in particular be gathered from FIG. 2b, which is a section along line B-B of FIG. 2a, the heater 4 has a row of parallel profile tubes 4.1 within which are located not shown PTC electric heating resistors for providing the heating power of the heater 4. The ends of the profile tubes 4.1 are in each case held by connection/holding parts 4.2, 4.2' and are electrically contacted for the power supply of the PTC resistors.

In order to be able to transfer the heat generated by the PTC resistors from the profile tubes 4.1 to an airflow L1, L2 (FIG. 1) through the heating device 1 or heater 4, a plurality of heat emission elements in the form of metal lamellas 4.3 are located on the profile tubes 4.1 and whereof only a few are shown in FIGS. 2a, b in order not to overburden representation. The lamellas 4.3 are parallel to one another and have suitable openings with which they can be pushed onto and clamped on the profile tubes 4.1 of heater 4. According to FIG. 2b the lamellas 4.3 are provided at their ends with curls or roll-ins 4.4, through which they are maintained in pairwise spaced manner.

Figure 3:
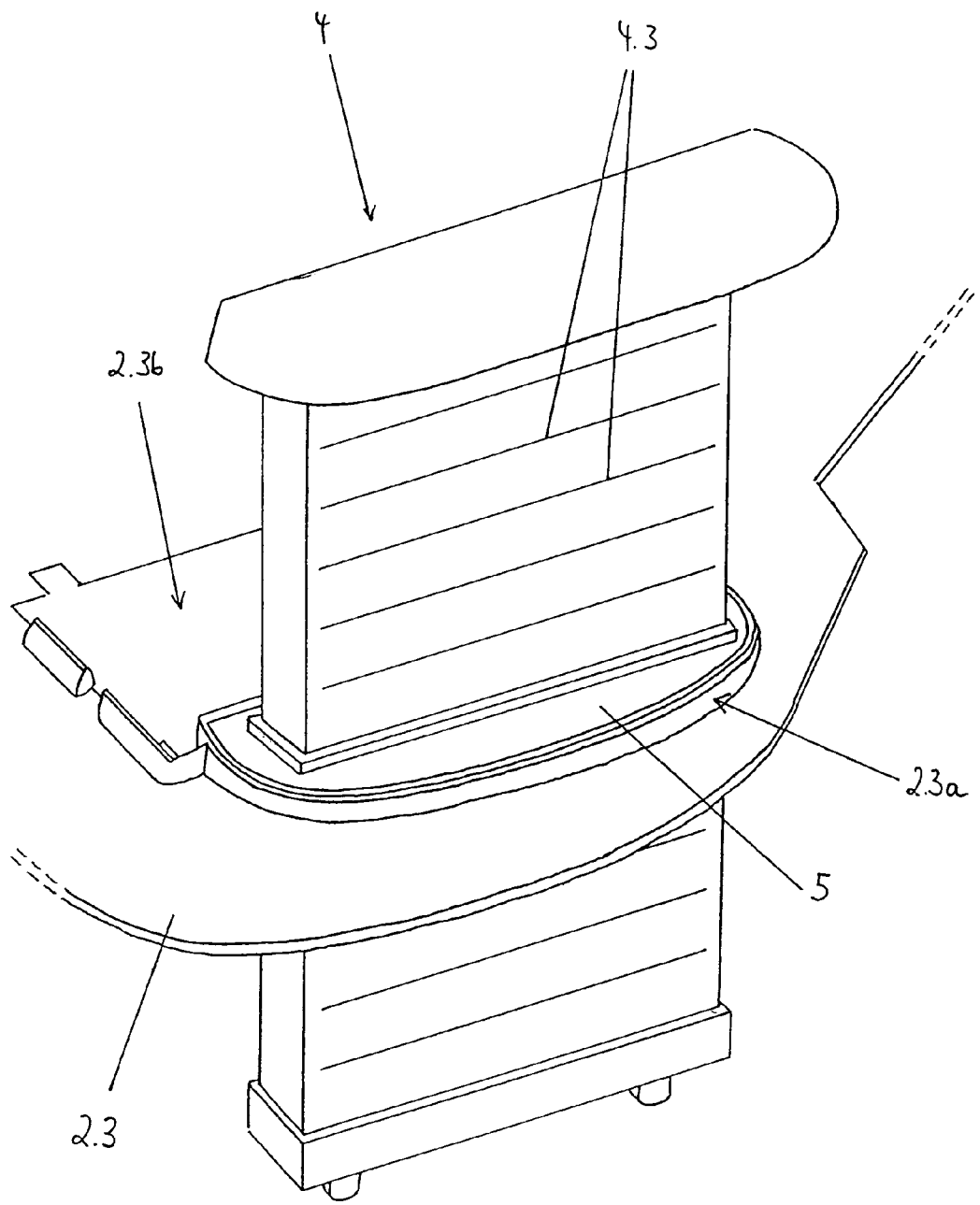
FIG. 3 A perspective view of the additional heater with separators pushed onto the lamellar heat emission elements and a holding part for receiving the same.

As shown in FIGS. 2a, b and represented in further detail by means of FIGS. 3, 4a, 4b, the separator 5 has a central opening with which it is pushed onto the heater 4 or more precisely onto the lamellas 4.3. This is diagrammatically represented in a perspective view in FIG. 3.

FIG. 3 shows the heater 4 with the separator 5 engaged on its lamellas 4.3 and which is inserted in a corresponding receptacle 2.3a in the partition wall 2.3 (FIG. 1) of casing 2 of heating device 1. A few lamellas 4.3 of heater 4 are indicated in exemplified manner. In an area behind the heater 4, FIG. 3 shows a receptacle 2.3b for the heat exchanger 3 of heating device 1 (cf. FIG. 1).

As can be seen in FIG. 3, the separator 5 of the inventive apparatus is substantially plate-shaped and its outer contour is based on that of a rectangle, but in the vicinity of a longitudinal side of the rectangle it has a rounded path, at least at the angles.

A possible inventive construction of the separator 4 is shown in detail in FIGS. 4a, b.

FIG. 4a is a plan view of a separator 5, which substantially corresponds to the separator shown in FIG. 3. The outer contour of separator 5 is substantially plate-shaped/rectangular and its angles 5.2, 5.2' defining its longitudinal side 5.1 are rounded with a radius R. For pushing onto the heater 4 (cf. FIG. 3) equipped with the lamellas 4.3, the separator 5 has a central opening 5.3, which is constructed in suitably dimensioned, rectangular manner corresponding to the dimensions of the lamellas 4.3 of heater 4. The length l and width b of the opening 5.3 correspond essentially to the dimensions of the lamellas 4.3. In the present case the entire circumference of the opening 5.3 engages in substantially gas-tight manner on the outer contour of several adjacent lamellas 4.3, without the interposing of seals.

On two inner walls 5.3a, 5.3b of the opening 5.3 engaging with the longitudinal sides of the lamellas 4.3, the separator 5 also has projections 5.4, which in the pushed on state of the separator engage in gaps between the lamellas 4.3 (cf. FIG. 2b) and in this way secure the separator against shifting in the direction of the extension of profile tubes 4.1 of heater 4.

According to the invention, the separator 5 is preferably made from a flexible, heat-resistant plastics material, so that for pushing on the separator 5 by pulling apart the longitudinal sides 5.1 or 5.3a, 5.3b an internal width of the opening 5.3 can be increased, so that the projections 5.4 can move past the lamellas 4.3 until the separator 5 is located in a desired position on the lamellas 4.3 of heater 4.

As can be seen in FIG. 4a, the separator 5 has two at least partly parallel, circumferential collars or flanges 5.5, 5.5' on its outer contour or on the edge of the opening 5.3 and a detailed explanation thereof will be given hereinafter relative to FIG. 4b.

FIG. 4b shows a cross-section through the separator 5 along a line B-B in FIG. 4a. The separator 5 has a circumferential, double H-shaped cross-sectional profile so that, despite the construction of the separator 5 from flexible plastics material and the provision of a central opening 5.3 reducing material costs, it is still possible to bring about a stable construction of the separator 5. As a result of the H-shaped profile of the separator 5, on its top 5a and bottom 5b are provided the above-mentioned flanges 5.5, 5.5', which are consequently formed by the free ends of the parallel sides of the H-shaped profile.

As a result of the above-described construction, the separator 5 of the inventive apparatus can be easily and reliably fitted on the lamellas 4.3 of a heater 4, despite an inexpensive construction. It is possible to fundamentally freely select its position on the heater 4 by shifting in the extension direction of profile tubes 4.1 (cf. FIG. 2b).

The invention claimed is:

1. Apparatus for separating fluid flows in a heating device, for heating the interior of a motor vehicle, comprising a heating device having at least one heater equipped with a plurality of lamellar heat emission elements and with a substantially plate-shaped separator with an opening and an inner contour adapted for the pushing of the separator onto the heater equipped with the lamellar heat emission elements, wherein the separator is made from a material having an adequate flexibility in order to be able to reversibly widen at least the opening for the pushing on of the heater equipped with the lamellar heat emission elements, so that the separator is subsequently held in force fit manner on the heat emission elements.

2. Apparatus according to claim 1, wherein, in the pushed on state, a plate plane of the separator is substantially perpendicular to a main extension direction of the heater.

3. Apparatus according to claim 1, wherein, in the pushed on state, a plate plan of the separator is substantially parallel to a longitudinal edge of a plurality of heat emission elements, which in particular are substantially parallel to one another and located on at least one tube of the heater, or at least one substantially sinusoidal heat emission element is positioned perpendicular to the plane of the sinusoidal path.

4. Apparatus according to claim 1, wherein the opening essentially has dimensions corresponding to a length and width of the heat emission elements.

5. Apparatus according to claim 1, wherein around circumference of the opening it engages in substantially gas-tight manner with the outer contour of the heat emission elements.

6. Apparatus according to claim 1, wherein the separator is made from a heat-resistant material.

7. Apparatus according to claim 1, wherein the separator is constructed from a plastic material.

8. Apparatus according to claim 1, wherein, at least in the vicinity of its opening, the separator has an adequate thickness for it to be in contact with at least two adjacent lamellar heat emission elements or with at least two adjacent bend-backs of at least one substantially sinusoidal, lamellar heat emission element.

9. Apparatus according to claim 8, wherein, at least in the vicinity of its opening, the separator has an adequate thickness for it to be in contact with at least three adjacent lamellar heat emission elements or with at least three adjacent bend-backs of at least one substantially sinusoidal, lamellar heat emission element.

10. Apparatus according to claim 1, wherein by projections located at the inner wall of the separator defining the opening and which can be engaged in the gap between at least two adjacent, substantially parallel lamellar heat emission elements or in the gap between at least two adjacent bend-backs of at least one substantially sinusoidal, lamellar heat emission.

11. Apparatus according to claim 1, wherein by projections on at least one inner wall of the separator defining the opening and extending parallel to the longitudinal edges of the heat emission elements and constructed for retaining the separator in a direction perpendicular to the orientation of the lamellar heat emission elements by in each case engaging in a gap between said heat emission elements.

12. Apparatus according to claim 1, wherein, downstream of a further heating unit of the heating device, such as a heat exchanger, the separator is linked with the cooling water circuit of a motor vehicle.

13. Apparatus according to claim 1, wherein an outer contour of the separator is constructed corresponding to a receptacle in a holding part for the separator and optionally the further heating unit.

14. Apparatus according to claim 1, wherein the outer contour of the separator is constructed in substantially rectangular manner with two rounded angles defining a longitudinal side of the contour rectangle.

15. Apparatus according to claim 1, wherein the separator has a circumferential, double H-shaped cross-sectional profile, whose parallel sides form the outer contour or the opening-defining inner walls of the separator.

* * * * *